US012637634B2

(12) United States Patent
Bell et al.

(10) Patent No.: US 12,637,634 B2
(45) Date of Patent: May 26, 2026

(54) NEUTRAL PH CLEANING FORMULATION

(71) Applicant: The Clorox Company, Oakland, CA (US)

(72) Inventors: Crystal Bell, Dublin, CA (US); Walter Schenck, Pleasanton, CA (US); Claire Dentinger, Pleasanton, CA (US); Miguel Lopez, Turlock, CA (US); Ana Carty, Pleasanton, CA (US); Zongyu Zhang, Pleasanton, CA (US); Pankaj Marwah, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 375 days.

(21) Appl. No.: 18/470,375

(22) Filed: Sep. 19, 2023

(65) Prior Publication Data

US 2025/0092334 A1 Mar. 20, 2025

(51) Int. Cl.

| | |
|---|---|
| ***C11D 3/00*** | (2006.01) |
| ***C11D 3/04*** | (2006.01) |
| ***C11D 3/30*** | (2006.01) |
| ***C11D 3/43*** | (2006.01) |
| ***C11D 3/48*** | (2006.01) |

(52) U.S. Cl.

CPC ................ *C11D 3/30* (2013.01); *C11D 3/046* (2013.01); *C11D 3/43* (2013.01); *C11D 3/48* (2013.01); *C11D 2111/14* (2024.01)

(58) Field of Classification Search

CPC .. C11D 3/30; C11D 3/046; C11D 3/43; C11D 3/48; C11D 2111/14; C11D 3/0047; C11D 3/10; C11D 3/2086; C11D 1/75

USPC ........................................................ 510/109

See application file for complete search history.

(56) References Cited

U.S. PATENT DOCUMENTS

| | | | | |
|---|---|---|---|---|
| 3,929,678 A | | 12/1975 | Laughlin et al. | |
| 4,259,217 A | | 3/1981 | Murphy | |
| 4,565,647 A | | 1/1986 | Llenado | |
| 4,659,519 A | * | 4/1987 | Ku | C07C 409/24 8/111 |
| 5,776,872 A | | 7/1998 | Giret et al. | |
| 5,883,059 A | | 3/1999 | Furman et al. | |
| 5,883,062 A | | 3/1999 | Addison et al. | |
| 5,906,973 A | | 5/1999 | Ouzounis et al. | |

(Continued)

FOREIGN PATENT DOCUMENTS

| | | |
|---|---|---|
| EP | 2276339 | 1/2011 |
| EP | 2853582 A1 | 4/2015 |

(Continued)

OTHER PUBLICATIONS

International Search Report from corresponding PCT Application No. PCT/US24/33811, mailed on Sep. 3, 2024, 9 pages.

*Primary Examiner* — Eisa B Elhilo
(74) *Attorney, Agent, or Firm* — Workman Nydegger

(57) ABSTRACT

A substantially neutral base multi-surface cleaning formulation. The formulation comprises an alkyl amine oxide surfactant, a levulinate solvent, a chelator and/or salt, and water. In some disclosed embodiments, the formulation further includes a buffer. The formulation has a substantially neutral pH from about 5 to about 8, from about 6 to about 8, or from about 6.5 to about 7.5. The formulation may be used as a spray, dosed on cleaning wipes, as a concentrate, in a soaps, or a wide variety of other forms.

21 Claims, 13 Drawing Sheets

(56) References Cited

U.S. PATENT DOCUMENTS

| | | | | |
|---|---|---|---|---|
| 8,222,194 | B2 | 7/2012 | Trivedi et al. | |
| 8,722,123 | B2 | 5/2014 | Doyle et al. | |
| 9,534,190 | B2 | 1/2017 | Larson, III et al. | |
| 9,549,886 | B2 * | 1/2017 | Yontz | A61K 8/31 |
| 10,154,950 | B2 | 12/2018 | Bobbert | |
| 11,312,925 | B2 * | 4/2022 | Foster | C11D 3/10 |
| 2011/0054026 | A1 | 3/2011 | Doyle et al. | |
| 2011/0311600 | A1 | 12/2011 | Polzin et al. | |
| 2012/0040880 | A1 * | 2/2012 | Rieth | C11D 3/2096<br>510/366 |
| 2012/0128614 | A1 * | 5/2012 | Rieth | A61K 8/4973<br>510/234 |
| 2013/0028990 | A1 | 1/2013 | Smith et al. | |
| 2014/0066356 | A1 | 3/2014 | Gaudreault | |
| 2017/0000706 | A1 | 1/2017 | Bobbert | |
| 2021/0171866 | A1 | 6/2021 | Barnabas et al. | |

FOREIGN PATENT DOCUMENTS

| | | | | |
|---|---|---|---|---|
| EP | 3082433 | A1 | 10/2016 | |
| EP | 3660136 | A1 * | 6/2020 | C11D 3/221 |
| EP | 4069810 | A1 | 10/2022 | |
| WO | 11/09031 | A3 | 5/2011 | |
| WO | 2022/122264 | A1 | 6/2022 | |

* cited by examiner

NEUTRAL PH CLEANING FORMULATION

CROSS REFERENCE TO RELATED APPLICATIONS

N/A.

BACKGROUND OF THE INVENTION

1. The Field of the Invention

The present invention relates to a substantially neutral pH cleaning formulation which can be used to clean kitchen grease as well as bathroom soil. Such substantially neutral pH cleaning formulation is an approachable, "green" cleaner with high cleaning performance in multiple areas.

2. Description of Related Art

Numerous cleaning formulations are available which are focused on cleaning specific types of soil. For example, conventional wisdom teaches that alkaline cleaners are best suited for kitchen grease removal, e.g., such as CLOROX FORMULA 409, while acidic cleaners are preferred for bathroom soil removal, e.g., such as CLOROX DISINFECTING BATHROOM CLEANER. While these various cleaners provide overall cleaning for certain soil types (e.g., kitchen grease versus bathroom soil), the strongly acidic and alkaline nature of these cleaners pose toxicology, surface safety, and environmental risks.

As such, there is a continuing need to transition from strongly acidic and alkaline formulations to neutral and "green" cleaning ingredients, but where such a formulation could still provide effective cleaning. It would be an additional advantage where a single given base formulation could provide good efficacy in both environments, i.e., removal of both kitchen grease and bathroom soil.

BRIEF SUMMARY

The present invention relates to a neutral pH cleaning composition suitable for use as a multi-surface cleaner, e.g., capable of removing both kitchen grease and bathroom soil. It is unusual for a given formulation to be suitable for use both as a kitchen grease cleaner, and as a bathroom soil cleaner. It is even more unusual for such a composition to have a substantially neutral pH. The components of the formulation advantageously can be selected so as to meet the EPA's Safer Choice standard (also known as DfE "Designed for the Environment" standard). The details of such standard are published by the EPA. Such U.S. government published standard is herein incorporated by reference in its entirety. The composition may also meet additional regulatory standards, e.g., EPA categories III or IV requirements (e.g., as detailed in 40 CFR 156.62, herein incorporated by reference), and/or be safe for use on food contact surfaces (e.g., as detailed in 40 CFR 180.940 (a)), without rinsing. The ability to meet such standards, while at the same time providing good results for removal of both kitchen grease and bathroom soil is particularly advantageous, and surprising. The disclosed substantially neutral pH cleaning composition may be incorporated into sprays, wipes, concentrates, soaps, and other cleaning compositions and/or dispensing methods. The substantially neutral pH cleaning composition uses substantially neutral and "green" cleaning ingredients therefore reducing or eliminating the toxicology, environmental, and safety concerns associated with conventional alkaline and acidic cleaners.

An exemplary embodiment is directed to a substantially neutral base multi-surface cleaning formulation comprising an alkyl amine oxide surfactant, a levulinate solvent, at least one of a buffer, chelator or a salt, and water. The formulation has a substantially neutral pH of from about 6 to about 8.

Another embodiment is directed to a substantially neutral base multi-surface cleaning formulation comprising an alkyl amine oxide surfactant, a levulinate solvent, a citrate (e.g., sodium citrate) chelator, a potassium salt (e.g., potassium chloride), at least one of a carbonate (e.g., sodium carbonate) or citric acid buffer, and water. The formulation has a substantially neutral pH of from about 6 to about 8.

Another embodiment is directed to a substantially neutral base multi-surface cleaning formulation comprising about 0.5% to about 10% (e.g., about 1% to about 10% of an alkyl amine oxide surfactant, about 0.5% to about 15% (e.g., about 1% to about 15%) of a levulinate solvent, about 0.1% to about 1% of a citrate (e.g., sodium citrate) buffer or chelator, a potassium salt (e.g., potassium chloride), about 0.1% to about 1% of a carbonate (e.g., sodium carbonate) and citric acid buffer, and water. The formulation has a substantially neutral pH of from about 5 to about 8, or from about 6.5 to about 7.5.

In an embodiment, the formulation includes at least 70%, at least 80%, or at least 90% water.

In an embodiment, the formulation comprises a sodium citrate buffer or chelator.

In an embodiment, the formulation comprises a potassium salt, such as potassium chloride or potassium EDTA.

In an embodiment, the formulation comprises a buffer.

In an embodiment, the formulation comprises at least one of sodium carbonate or citric acid, or a mixture of sodium carbonate and citric acid as a buffer.

In an embodiment, the formulation comprises the alkyl amine oxide surfactant in a weight percentage from about 0.5% to about 10%, or from about 1% to about 10%.

In an embodiment, the formulation comprises the alkyl amine oxide surfactant in a weight percentage from about 2% to about 4%.

In an embodiment, the formulation comprises the levulinate solvent in a weight percentage from about 0.5% to about 15%, or about 1% to about 15%.

In an embodiment, the formulation comprises the levulinate solvent in a weight percentage from about 2% to about 8%.

In an embodiment, the formulation comprises the chelator in a weight percentage from about 0.1% to about 1%.

In an embodiment, the formulation comprises the chelator in a weight percentage from about 0.44% to about 0.66%.

In an embodiment, the formulation comprises both the chelator and the salt.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope.

The invention will be described and explained with additional specificity and detail through the use of the accompanying drawings.

DETAILED DESCRIPTION OF THE PREFERRED EMBODIMENTS

I. Definitions

Figure 1:
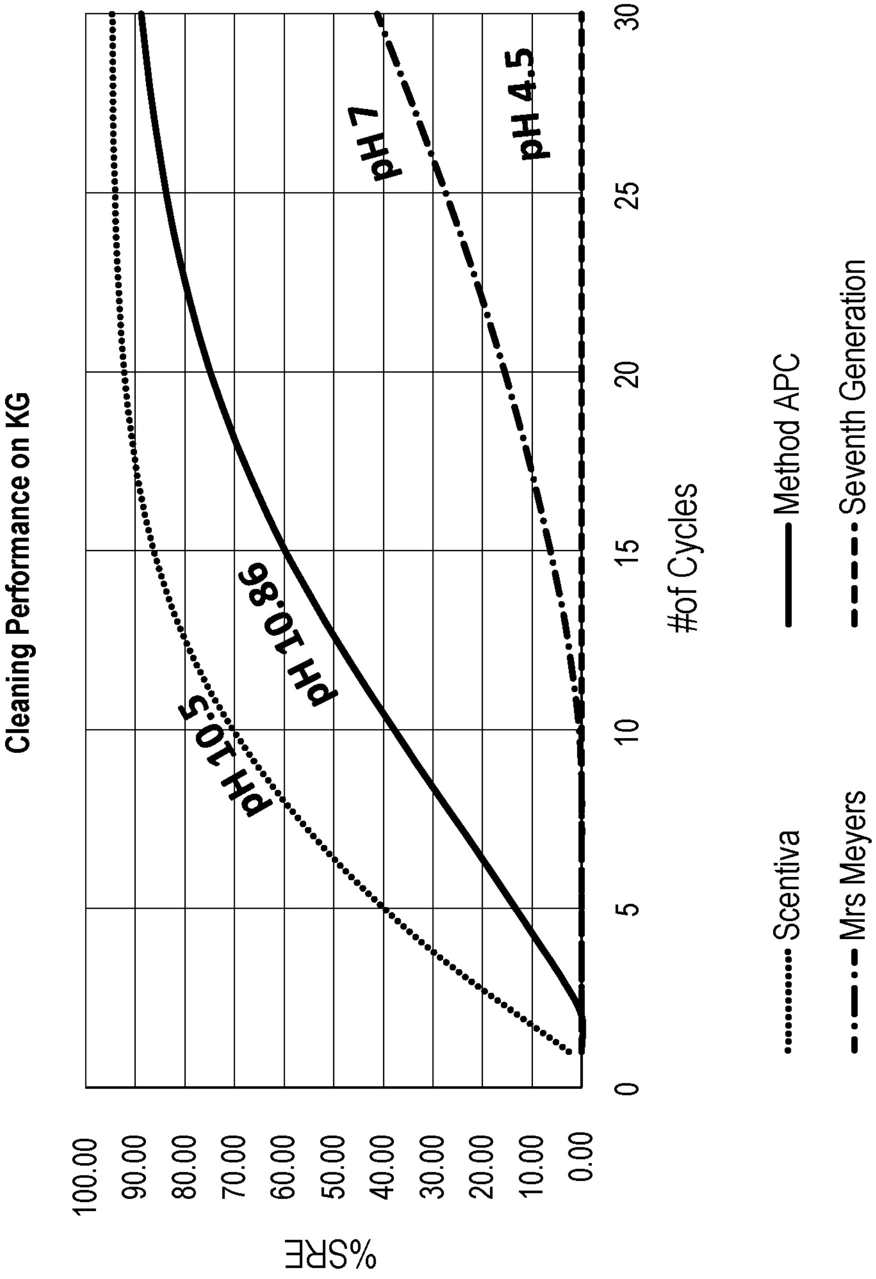
FIG. 1 shows experimental results of cleaning performance on kitchen grease of various commercially available products.

Before describing the present invention in detail, it is to be understood that this invention is not limited to particularly exemplified systems or process parameters that may, of course, vary. It is also to be understood that the terminology used herein is for the purpose of describing particular embodiments of the invention only and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The terms buffer, chelator, pH adjuster or pH modifier may be used to describe the same component in the formula (e.g., a given component may serve more than one purpose). A non-limiting example of such is a citrate (e.g., sodium citrate) chelator/buffer/pH adjuster.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

The term "Safer Choice" means the U.S. EPA program that is focused on identifying safer sanitizing and disinfecting active ingredients. The EPA has a special approval process for products that meet the Safer Choice criteria. The EPA, as part of the Safer Choice program has identified certain active ingredients that are approved for cleaning products and authorized to use the Safer Choice logo. Products that have been approved may be found under https://www.epa.gov/pesticide-labels/design-environment-logo-antimicrobial-pesticide-products #authorizeddfe. Approved products must have only ingredients that meet the "Safer Choice Standard" according to https://www.epa.gov/pesticide-labels/design-environment-logo-antimicrobial-pesticide-products #fapproved and https://www.epa.gov/saferchoice/safer-choice-standard. The above EPA publications are herein incorporated by reference in their entirety.

The term "food contact surface" means as defined by the EPA and/or FDA. For example, the FDA defines the term in its "Food Code" 1-201.10 as (1) a surface of equipment or a utensil with which food normally comes into contact; or (2) a surface of equipment or a utensil from which food may drain, drip, or splash (a) into a food, or (b) onto a surface normally in contact with food. Compositions meeting safe for food contact surface requirements are defined under 40 CFR 180.940 (a), 40 CFR 180.950 and/or 40 CFR 180.960, each of which is herein incorporated by reference in its entirety.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Reference to ASTM or other standards or standardized tests refers to the latest version of such standard, unless otherwise specified. Standards referenced herein are herein incorporated by reference in their entirety.

II. Exemplary Substantially Neutral pH Cleaning Formulations

In an aspect, the present invention is directed to a substantially neutral pH cleaning formulation that is effective on multiple different surfaces and soils, such as kitchen grease and bathroom soil. The components included in the formulation may advantageously meet the EPA Safer Choice standard. Typically, formulations for effective removal of kitchen grease or bathroom soil have either strongly alkaline or acidic pHs, respectively. While strongly acidic and alkaline pH formulations may be effective in cleaning, such formulations pose toxicology, surface safety, and environmental concerns. In contrast, disclosed embodiments of the invention are particularly advantageous due to the formulation's substantially neutral pH nature while still providing efficacy on a wide variety of soils and surfaces. Embodiments use a unique mixture of components that meet the U.S EPA SaferChoice requirements while maintaining efficacy as a multi-surface cleaner, such as on both kitchen grease and bathroom soil. The formulation may be used in sprays, as a concentrate, on pre-loaded wipes, or other forms. The formulation described is a "base" formulation, such that various components may be added thereto, for various specific applications. The formulation thus provides a broad or generic base formulation that can be adjusted (by addition of various adjuncts) to provide a specific formulation tailored to a specific use.

An example embodiment of a substantially neutral pH formulation includes an alkyl amine oxide surfactant, a levulinate solvent, and water. At least one of a buffer, chelator or a salt may further be included, for boosted efficacy. The formulation has a pH that is substantially neutral, e.g., from 5 to about 8, from about 6 to about 8, or from about 6.5 to 7.5. Additionally, in some example embodiments, the substantially neutral pH formulation includes a buffer. In another exemplary embodiment, the substantially neutral pH formulation includes an alkyl amine oxide surfactant, a levulinate solvent, a citrate chelator (e.g., sodium citrate), a potassium salt (e.g., potassium chloride or potassium EDTA), water, and a buffer (e.g., a carbonate such as sodium carbonate, and/or citric acid).

The substantially neutral pH of the present formulations advantageously renders them more safe from a toxicology and safety perspective (e.g., less likely to result in acidic or alkaline chemical burns, etc.), allows them to be safely used on a wider variety of surfaces without risk of damage to such surfaces, and the like. Such combination of characteristics is very advantageous.

a. Surfactants

In example embodiments, the formulation includes the alkyl amine oxide surfactant in a weight percentage from at least 1%, at least 1.25%, at least 1.5%, or at least 2%, such as from about 1% to about 10%, from about 1.25% to about 8%, from about 1.5% to about 5%, from about 1.5% to about 4%, from about 2% to about 4%, or from about 2% to about 3%. In some embodiments, a second surfactant may be added to the formulation. In an embodiment, such second surfactant can include a nonionic surfactant, an anionic surfactant, an amphoteric or zwitterionic surfactant, or a cationic surfactant. Non-limiting examples of exemplary useful secondary surfactants may include alkyl polyglucosides, alkyl sulfates, sophorolipids, or ethoxylated alcohols.

Non-limiting examples of anionic surfactants that may be suitable for use in the present formulations include alkyl sulfates (e.g., $C_8$-$C_{18}$ or $C_8$-$C_{12}$ linear or branched alkyl sulfates such as sodium lauryl sulfate (SLS), sodium n-octyl sulfate and sodium tetradecylsulfate), alkyl sulfonates (e.g., $C_6$-$C_{18}$ or $C_8$-$C_{12}$) linear or branched alkyl sulfonates such as sodium octane sulfonate and secondary alkane sulfonates, alkyl ethoxysulfates, fatty acids and fatty acid sulfate or sulfonate salts (e.g., $C_6$-$C_{16}$ fatty acid soaps such as sodium laurate), and alkyl amino acid derivatives. Other examples may include sulfate derivatives of alkyl ethoxylate propoxylates, alkyl ethoxylate sulfates, alpha olefin sulfonates, $C_6$-$C_{16}$ acyl isethionates (e.g. sodium cocoyl isethionate), $C_6$-$C_{18}$ alkyl, aryl, or alkylaryl ether sulfates, $C_6$-$C_{18}$ alkyl, aryl, or alkylaryl ether methyl-sulfonates, $C_6$-$C_{18}$ alkyl, aryl, or alkylaryl ether carboxylates, sulfonated alkyldiphenyloxides (e.g. sodium dodecyldiphenyloxide disulfonate), and the like.

Examples of nonionic surfactants include, but are not limited to, alcohol ethoxylates, alcohol propoxylates, other alcohol alkoxylates including fatty (e.g., $C_6$, $C_8$, $C_{10}$, or $C_{12}$, or higher) alcohols or other constituents that have been alkoxylated to include both ethoxy and propoxy groups (EO-PO surfactants), alkyl phosphine oxides, alkyl glucosides and alkyl pentosides, alkyl glycerol esters, alkyl ethoxylates, and alkyl and alkyl phenol ethoxylates of all types, poly alkoxylated (e.g. ethoxylated or propoxylated) $C_6$-$C_{12}$ linear or branched alkyl phenols, $C_6$-$C_{22}$ linear or branched aliphatic primary or secondary alcohols, and $C_2$-$C_8$ linear or branched aliphatic glycols. Block or random copolymers of $C_2$-$C_6$ linear or branched alkylene oxides may also be suitable nonionic surfactants. Capped nonionic surfactants in which the terminal hydroxyl group is replaced by halide; $C_1$-$C_8$ linear, branched or cyclic aliphatic ether; $C_1$-$C_8$ linear, branched or cyclic aliphatic ester; phenyl, benzyl or $C_1$-$C_4$ alkyl aryl ether; or phenyl, benzyl or $C_1$-$C_4$ alkyl aryl ester may also be used. Sorbitan esters and ethoxylated sorbitan esters are additional examples of nonionic surfactants. Other nonionic surfactants may include mono or polyalkoxylated amides of the formula $R^1CONR^2R^3$ and amines of the formula $R^1NR^2R^3$ wherein $R^1$ is a $C_5$-$C_{31}$ linear or branched alkyl group and $R^2$ and $R^3$ are $C_1$-$C_4$ alkyl, $C_1$-$C_4$ hydroxyalkyl, or alkoxylated with 1-3 moles of linear or branched alkylene oxides. Biosoft 91-6 (Stepan Co.) is an example of an alkyl ethoxylate (or alcohol ethoxylate) having a methylene chain length of $C_9$ to $C_{11}$ with an average of 6 moles of ethoxylation. An example of an alcohol ethoxylate is ECOSURF EH-9, which is more specifically an ethylene oxide-propylene oxide copolymer mono(2-ethylhexyl) ether, available from Dow.

Alkylpolysaccharide (e.g., alkylpolyglucoside or alkylpolyglycoside) nonionic surfactants are disclosed in U.S. Pat. No. 4,565,647 to Llenado, having a linear or branched alkyl, alkylphenyl, hydroxyalkyl, or hydroxyalkylphenyl group containing from 6 to 30 carbon atoms and a polysaccharide, e.g., a polyglycoside, hydrophilic group containing from 1.3 to 10 saccharide units. Suitable saccharides may include, but are not limited to, glucosides, galactosides, lactosides, and fructosides. Alkylpolyglycosides may have the formula: $R^2O(CnH_{2n}O)_t(\text{glycosyl})_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 10.

Fatty acid saccharide esters and alkoxylated fatty acid saccharide esters are additional examples of nonionic surfactants. Examples include, but are not limited to, sucrose esters, such as sucrose cocoate, and sorbitan esters, such as polyoxyethylene (20) sorbitan monooleate and polyoxyethylene (20) sorbitan monolaurate.

Phosphate ester surfactants are another example of nonionic surfactants. These include mono, di, and tri esters of phosphoric acid with $C_4$-$C_{18}$ alkyl, aryl, alkylaryl, alkyl ether, aryl ether and alkylaryl ether alcohols (e.g. disodium octyl phosphate).

Zwitterionic surfactants include both a positive and negative functional group, and may therefore also be classified as nonionic surfactants. Many such zwitterionic surfactants contain nitrogen. Examples of such include amine oxides, sarcosinates, taurates and betaines. Examples include $C_8$-$C_{18}$ alkyldimethyl amine oxides (e.g., octyldimethylamine oxide, lauryldimethylamine oxide (also known as lauramine oxide), and cetyldimethylamine oxide), $C_4$-$C_{16}$ dialkylmethylamine oxides (e.g. didecylmethyl-amine oxide), $C_8$-$C_{18}$ alkyl morpholine oxide (e.g. laurylmorpholine oxide), tetra-alkyl diamine dioxides (e.g. tetramethyl hexane diamine dioxide, lauryl trimethyl propane diamine dioxide), $C_8$-$C_{18}$ alkyl betaines (e.g. decylbetaine and cetylbetaine), $C_8$-$C_{18}$ acyl sarcosinates (e.g. sodium lauroylsarcosinate), $C_8$-$C_{18}$ acyl $C_1$-$C_6$ alkyl taurates (e.g. sodium cocoylmethyltaurate), $C_8$-$C_{18}$ alkyliminodipropionates (e.g. sodium lauryliminodipropionate), and combinations thereof. Lauryl dimethyl amine oxide (Ammonyx LO) myristyl dimethyl amine oxide (Ammonyx MO), decylamine oxide (Ammonyx DO) are examples of zwitterionic amine oxide surfactants, available from Stepan Co.

Various surfactants and other optional adjuvants are disclosed in U.S. Pat. No. 3,929,678 to Laughlin and Heuring, U.S. Pat. No. 4,259,217 to Murphy, U.S. Pat. No. 5,776,872 to Giret et al.; U.S. Pat. No. 5,883,059 to Furman et al.; U.S. Pat. No. 5,883,062 to Addison et al.; U.S. Pat. No. 5,906,973 to Ouzounis et al.; U.S. Pat. No. 4,565,647 to Llenado, and U.S. Publication No. 2013/0028990. The above patents and applications are each herein incorporated by reference in their entirety.

b. Solvents

In example embodiments, the formulation includes a levulinate solvent. Those of skill in the art will appreciate that levulinates are derivatives of levulinic acid, e.g., including the below structure.

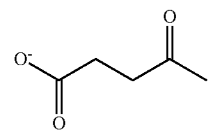

Such levulinate solvents have been found by applicant to exhibit characteristics that make them an excellent choice for use in a multi-purpose cleaner, e.g., being effective in removing both oily soils (e.g., kitchen grease) as well as mineral deposits (e.g., such as typical in bathroom soil), even at substantially neutral pH values.

In an embodiment, the levulinate solvent is present in the formulation in an a weight percentage of at least 1%, at least 1.25%, at least 1.5%, or at least 2%, up to 15%, up 12%, up to 10%, or up to 8%, such as from about 1% to about 15%, or from about 1.25% to about 12%, or from about 1.5% to about 10%, from about 2% to about 8%, from about 1.5% to about 5%, from about 1.5% to about 4%, or from about 1.5% to about 3%. In some instances, the levulinate solvent is an alkyl levulinate solvent. The alkyl group of the alkyl butyl levulinate may have from 1 to about 12, 1 to about 8 or 2 to about 6 carbons (e.g., 2, 3, 4, 5, or 6 carbons). In an embodiment, the levulinate solvent is a butyl levulinate solvent. Additional solvents may also be used, or present.

Non-limiting examples of additional solvents that could be included include glycol ethers. Exemplary glycol ether solvents include, but are not limited to, ethylene glycol monopropyl ether, ethylene glycol monobutyl ether, ethylene glycol monohexyl ether, ethylene glycol phenyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, tripropylene glycol n-butyl ether (TPnB), diethylene glycol monohexyl ether, propylene glycol phenyl ether (PPh), acetate and/or propionate esters of glycol ethers. Other solvents, particularly naturally sourced or derived solvents, are also possible. Where present, additional solvents may be included in amounts of at least 0.1%, in amounts of at least 0.25%, up to 5%, up to 4%, up to 3%, up to 2%, or up to 1% by weight of the cleaning composition. While both lower alcohols (e.g., $C_1$-$C_4$ alcohols) and higher chain length alcohols (e.g., $C_5$ and higher, such as $C_6$ to $C_{16}$, $C_8$ to $C_{12}$, $C_{10}$, etc.) may sometimes be used as solvents, their absence (particularly lower alcohols) can be beneficial in minimizing the presence of VOC components, as well as for other reasons. If present, the amount of such volatile solvents may be limited, e.g., to less than 5%, less than 3%, less than 2%, less than 1%, less than 0.5%, less than 0.3%, less than 0.2%, less than 0.1%, less than 0.05%, or less than 0.01% by weight.

c. Salts, Chelators & Other Adjuvants

In some example embodiments, the formulation optionally includes at least one of a salt or a chelator. The inclusion of such salts and/or chelating agents may enhance stability and/or efficacy of the formulation. Chelating agents in particular are able to remove or sequester divalent cations (e.g., $Ca^{2+}$, $Mg^{2+}$, etc.), thereby improving the formulation's stability and efficacy. In an embodiment, any included salts exclude such divalent cations. Non-limiting examples of possible chelators include aminocarboxylate salts, such as salts (e.g., a trisodium salt) of methylglycinediacetic acid (MGDA), salts (e.g., a tetra sodium salt) of glutamic acid diacetic acid (GLDA or DGS), salts (e.g., a trisodium salt) of alanine, N,N-bis(carboxymethyl), sodium citrate, glucaric acid or salts thereof, glutamic acid or salts thereof, N,N-diacetic acid or salts thereof, tetra sodium salts, EDTA salts, tartaric acid or salts thereof, fluconic acid or salts thereof, tricaballyic acid or salts thereof, acetic acid or salts thereof, citric acid or salts thereof, or combinations thereof. In some embodiments, the formulation includes the salt or chelator individually or collectively in a weight percentage from about 0.1% to about 5%, about 0.1% to about 3%, about 0.5% to about 3%, about 1% to about 3%, about 1% to about 2%, from about 0.2% to about 0.9%, from about 0.3% to about 0.8%, from about 0.4% to about 0.7%, or from about 0.44% to about 0.66%. In embodiments containing the salt, the salt may comprise a potassium salt, such as potassium chloride or potassium EDTA.

Additionally, some embodiments include a buffer. Some buffers may also serve as chelators, and/or pH adjusters. Examples of buffers include carbonates, silicates, and citric acid or citrates. More specific exemplary buffers include sodium carbonate, citric acid, or a mixture of sodium carbonate and citric acid. In embodiments including the buffer, the formulation may include the buffer in a weight percentage from about 0.1% to about 1%, or from about 0.2% to about 0.8%, or from about 0.28% to about 0.45%. In some embodiments, the buffer includes citric acid in a weight percentage from about 0.13% to about 0.26% and sodium carbonate in a weight percentage from about 0.15% to about 0.30%.

The formulation further includes water. Water may typically comprise the majority of the formulation, e.g., accounting for at least 50%, at least 60%, at least 70%, at least 80%, at least 90%, or at least 95% by weight of the formulation. Even concentrated formulations, intended for dilution, may include such relatively high fractions of water. In an embodiment, water may be included in amounts to bring the weight percentage to 100% based on the other components described above. Additionally, the disclosed cleaning composition has a substantially neutral pH. In some embodiments, the pH of the formulation is from about 5 to about 9, from about 6 to about 8, or from about 6.5 to about 7.5.

The formulations may be of relatively low viscosity (e.g., less than 1000 cps, less than 500 cps, or less than 100 cps, such as from 1 cps to 1000 cps, or 1 cps to 100 cps). In an embodiment, a thickener could be present, providing higher viscosity.

The present formulations may optionally include and/or be used in combination with one or more additional adjuncts. The adjuncts include, but are not limited to, pH adjusters, additional solvents, fragrances or perfumes, dyes and/or colorants, builders, defoamers, thickeners, hydrotropes, antimicrobial agents, preservatives, solubilizing materials, stabilizers, lotions and/or mineral oils, enzymes, cloud point modifiers and mixtures or combinations thereof.

Embodiments of the substantially neutral pH formulation may be used in cleaning sprays (e.g., trigger sprayers, FLAIROSOL sprayers, aerosol sprays), concentrates, wipes (e.g., woven wipes, non-woven wipes, pulp fiber wipes), dish soaps, hand soaps, laundry formulations, surface cleaners, disinfecting or sanitizing formulations (e.g., upon addition of a quaternary amine or other antimicrobial agent), or other cleaning formulations.

III. Experimental Data and Results

Turning now to the Figures, the Figures illustrate experimental data of example embodiments and experimental results of exemplary formulations, in comparison to commercially available cleaning formulations. In some Figures, example experimental data is shown which was used to create some example embodiments of the cleaning composition.

Figure 2:
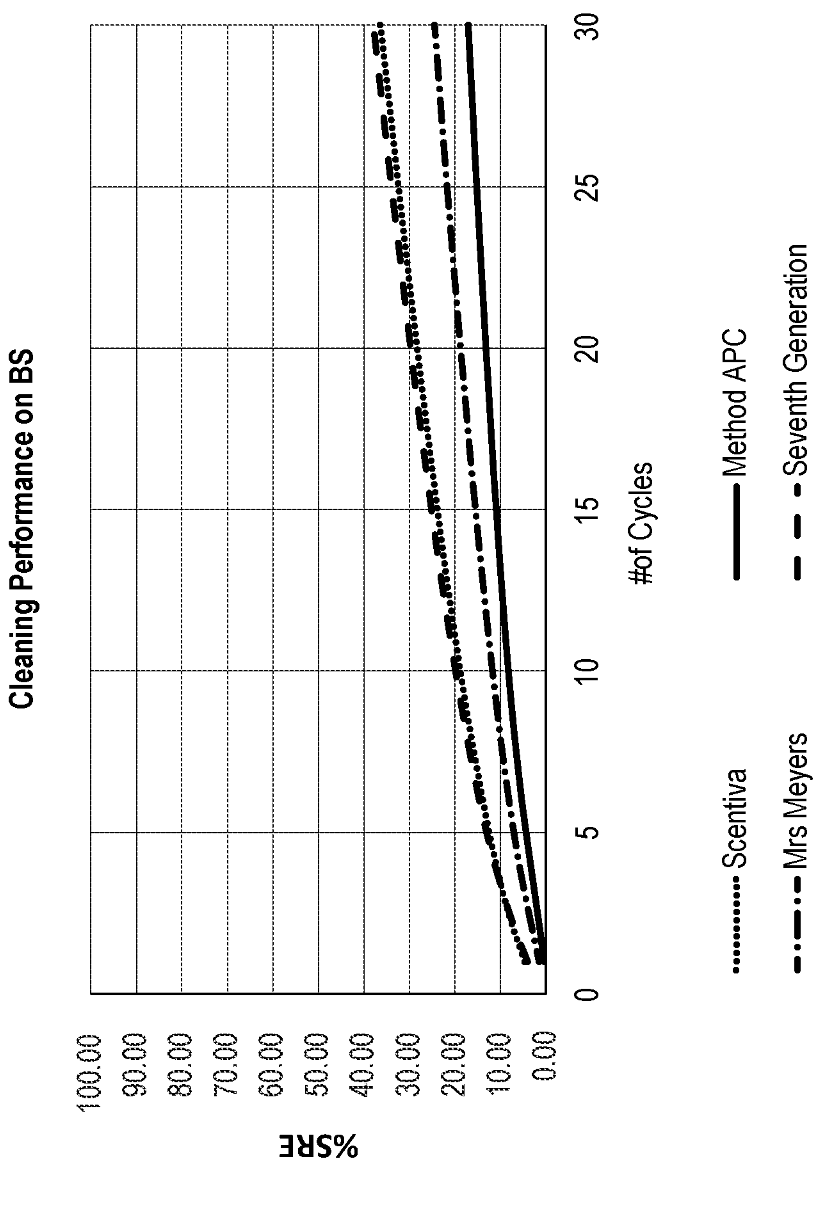
FIG. 2 shows experimental results of cleaning performance on bathroom soil of various commercially available products.

FIGS. 1 and 2 illustrate soil removal efficiency ("SRE") experimental testing results for several commercially available cleaning compositions. In more detail, FIG. 1 illustrates the SRE of SCENTIVA, MRS. MEYERS, METHOD APC, and SEVENTH GENERATION cleaning formulations, on kitchen grease. As shown in FIG. 1, SCENTIVA has a pH of 10.5, METHOD APC has a pH of 10.86, MRS. MEYERS has a pH of 7, and SEVENTH GENERATION has a pH of 4.5. As confirmed by FIG. 1, conventional wisdom holds that alkaline formulations are better suited as cleaning compositions against kitchen grease.

FIG. 2 illustrates the cleaning performance of the same commercially available cleaning compositions, but against bathroom soil. Conversely to kitchen grease, conventional wisdom holds that acidic compositions are most effective for cleaning bathroom soil. The results shown in FIG. 2 are generally consistent with such (other than the fact that SCENTIVA is unexpectedly as effective as the acidic SEVENTH GENERATION formulation).

Figure 3:
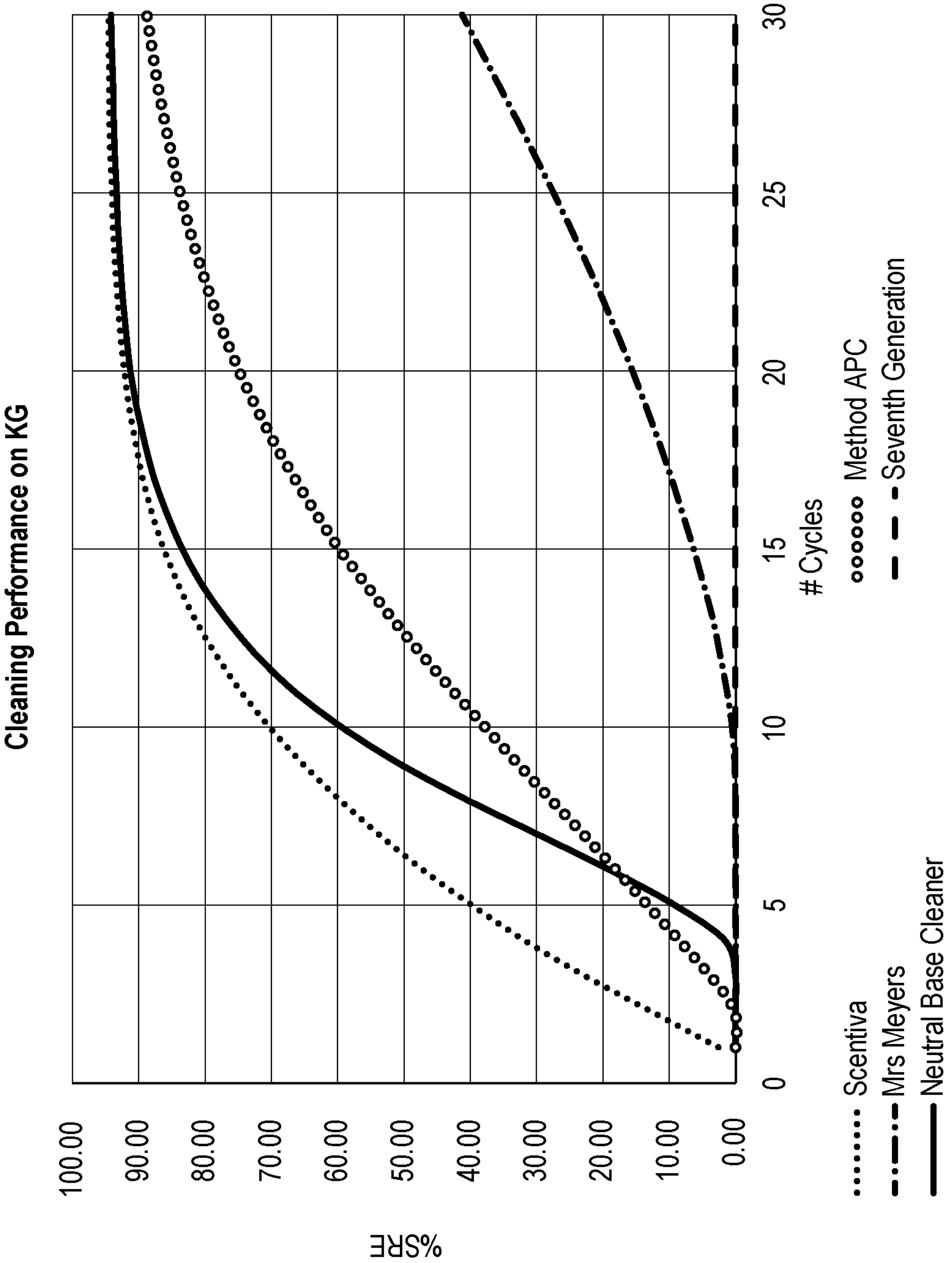
FIG. 3 shows experimental results of cleaning efficacy on kitchen grease of disclosed embodiments compared to commercially available products.

FIG. 3 illustrates SRE results of the cleaning efficacy against kitchen grease for an exemplary formulation according to the present invention (labeled as neutral base cleaner), as compared to the same commercially available cleaning formulations seen in FIG. 1. The exemplary substantially neutral base cleaner of FIG. 3 included 2% alkyl amine oxide surfactant, 2% levulinate solvent, 0.44% sodium citrate chelator, and a buffer including 0.13% citric acid and 0.15% sodium carbonate.

As shown in FIG. 3, the exemplary substantially neutral base cleaner reaches a similar cleaning efficacy as SCENTIVA spray by about cycle 15-20 (i.e., about 90% SRE). In contrast, Method APC only reaches about 75% SRE by cycle 20. MRS. MEYERS only reaches about 18% SRE after 20 cycles, and SEVENTH GENERATION has 0% cleaning efficacy, even after 20 cycles. Advantageously, the exemplary substantially neutral base cleaner is very effective as a kitchen grease cleaner.

Figure 4:
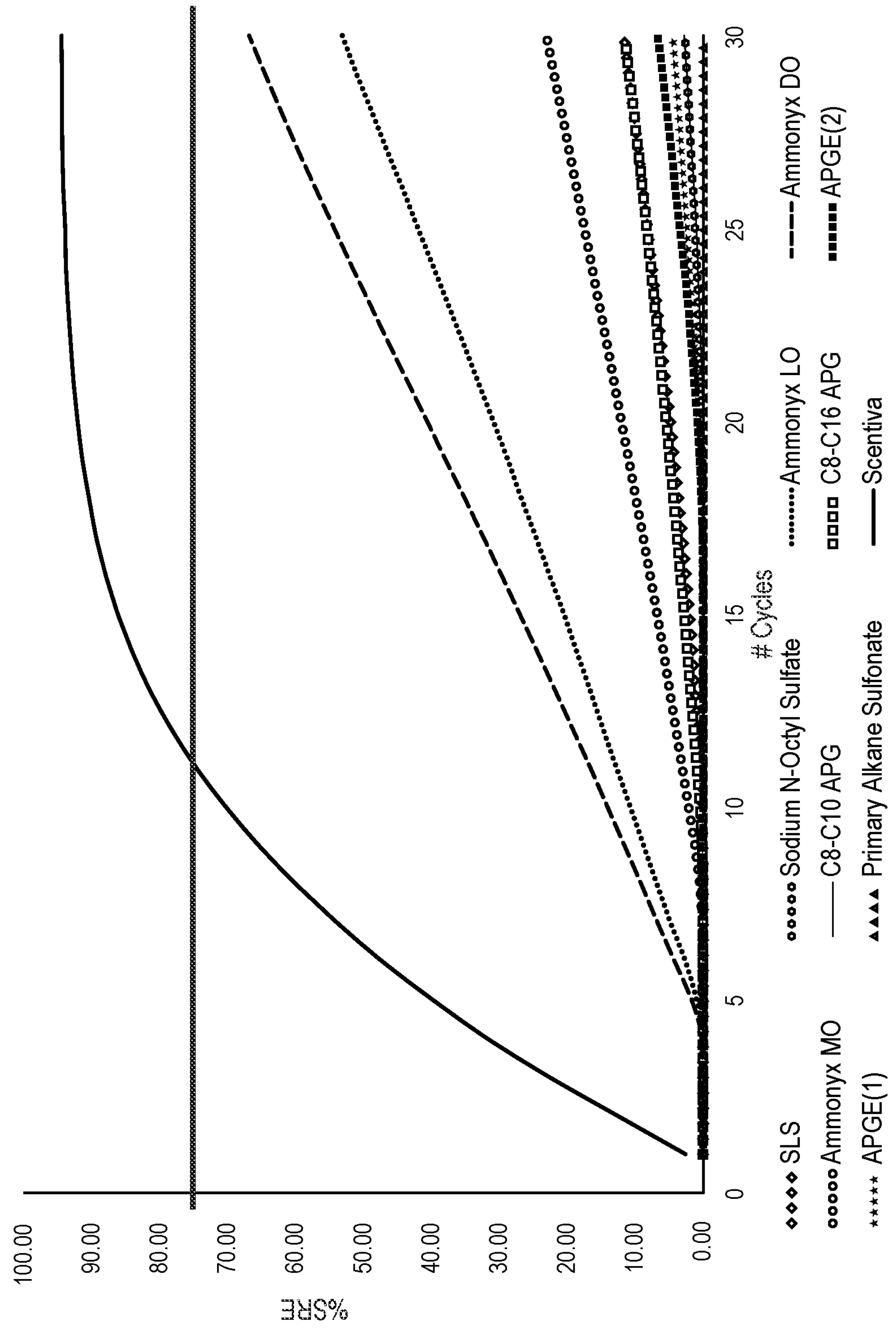
FIG. 4 shows experimental results of cleaning performance on kitchen grease of various diluted neat surfactants compared to a commercially available product.

In developing the present formulations, applicant found that the cleaning efficiency of a neat surfactant alone (i.e., the surfactant alone, in water) is an important aspect in driving cleaning, at substantially neutral pH values. Turning to FIG. 4, the Figure shows the SRE cleaning performance of different "neat" surfactants against kitchen grease. In the experiment conducted in FIG. 4, the neat surfactants were diluted to 2% (i.e., 98% water). A broad range of nonionic, anionic, and amphoteric surfactants were tested. For comparison, FIG. 4 also shows SRE performance of SCENTIVA. The surfactants used in the experiment included sodium lauryl sulfate, myristamine oxide (e.g., Ammonyx MO), lauramine oxide (Ammonyx LO), decylamine oxide (Ammonyx DO), two different alkyl polyethylene glycol ethers ("APGE"), for example, each made from a C10-Guerbet alcohol and ethylene oxide) (e.g., LUTENSOL), sodium-n-octyl sulfate, an alkylpolyglucoside based on a C8 to C10 natural fatty alcohol, an alkylpolyglucoside based on a C8 to C16 natural fatty alcohol, and primary alkane sulfonate. The screened surfactants include non-ionic surfactants, anionc surfactants, and amphoteric surfactants. As shown in FIG. 4, decylamine oxide and lauramine oxide demonstrated the highest cleaning efficacy against kitchen grease.

Figure 5:
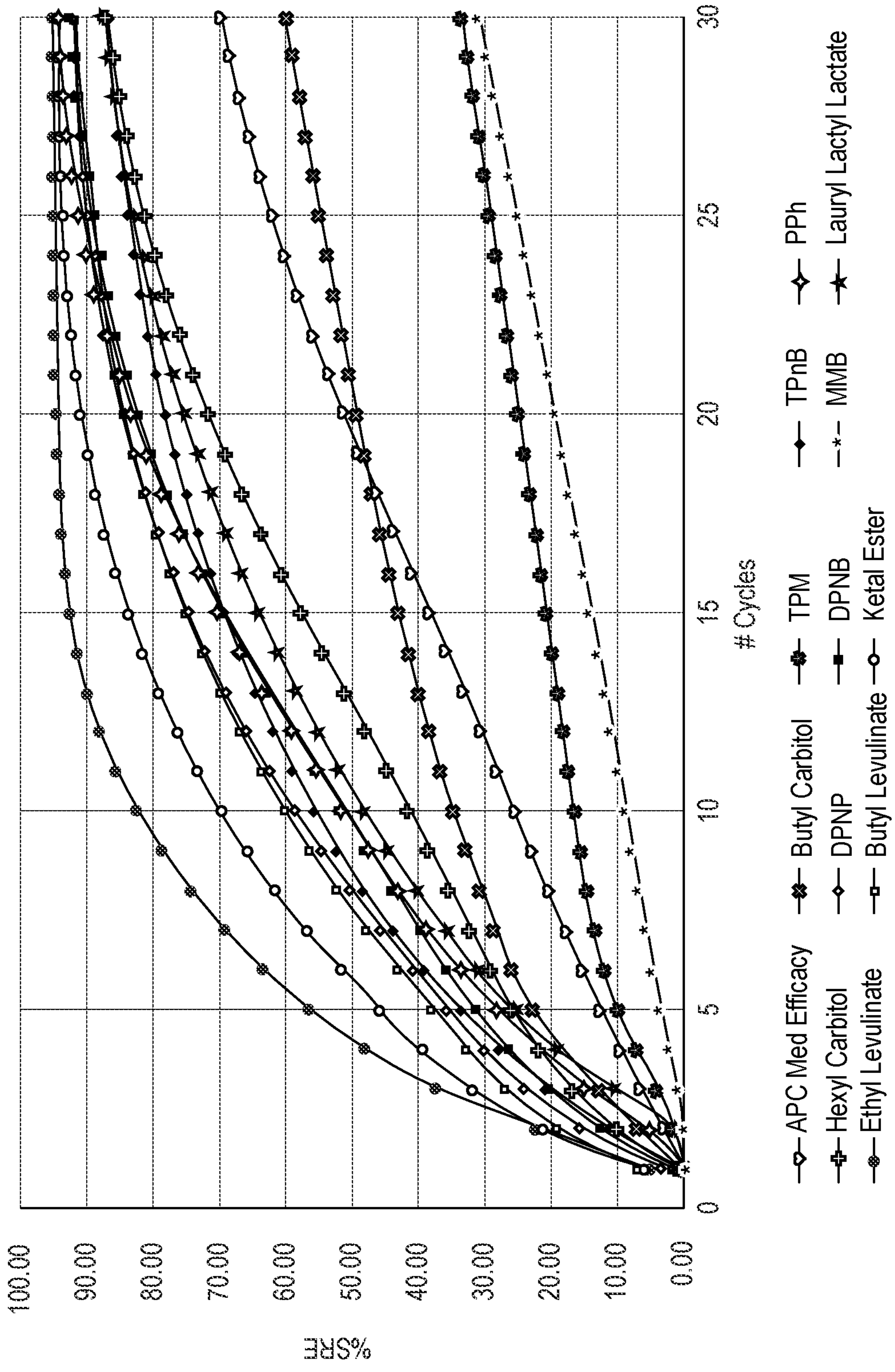
FIG. 5 shows experimental results of cleaning performance on kitchen grease of various diluted neat solvents.

FIG. 5 shows experimental results of various non-limiting exemplary solvents, and their cleaning efficacy against kitchen grease in "neat" form. The solvents were selected based on their miscibility with canola oil. Solvents that exhibit good solubility in canola oil will aid cleaning performance of a substantially neutral pH formulation, due to similar intermolecular reactions between the solvent and the canola oil, as would occur with kitchen grease. Exemplary solvents that are miscible with canola oil include butyl carbitol, tripropylene glycol monomethyl ether, DPnB glycol ether, dipropylene glycol n-propyl ether ("DPnP"), dipropylene glycol n-butyl ether ("TPnB"), hexyl carbitol, propylene glycol phenyl ether ("PPh"), 3-methoxy-3-methyl-1-butanol ("MMB"), Lauryl Lactyl Lactate (e.g., Stepan mild L3), Ethyl levulinate solvent, a butyl levulinate solvent, and a ketal ester (e.g., a levulinic ketal ester) solvent.

As shown in FIG. 5, the ethyl levulinate solvent, the ketal ester solvent, and the butyl levulinate solvent had the best cleaning efficacy against kitchen grease, reaching a SRE of at least 75% within less than about 15 cycles. Some solvents that demonstrated the poorest cleaning performance on kitchen grease included butyl carbitol, tripropylene glycol monomethyl ether ("TPM"), and 3-methoxy-3-methyl-1-butanol ("MMB"); they often did not reach even 75% soil removal after as many as 30 cycles.

Figure 6:
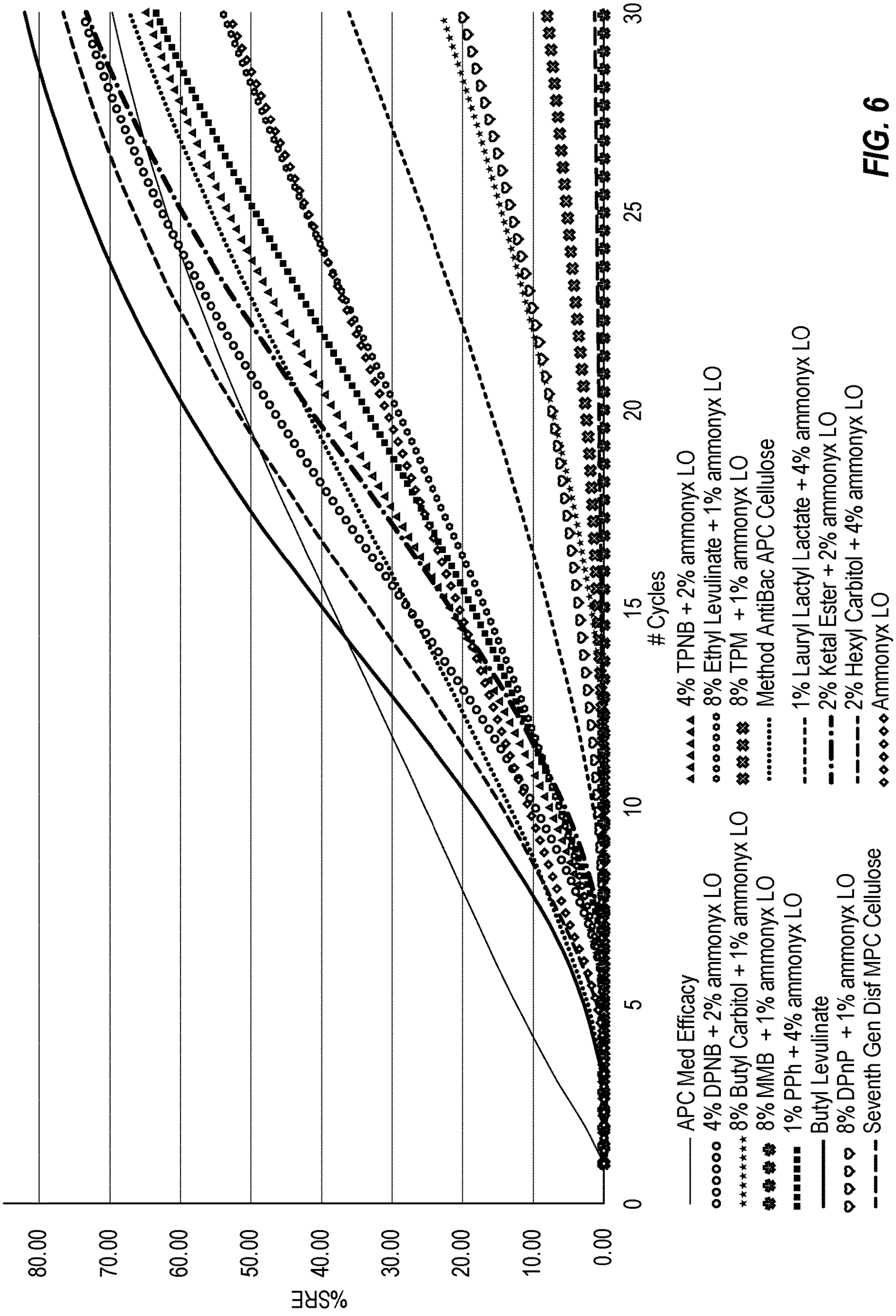
FIG. 6 shows experimental results of cleaning performance on kitchen grease of disclosed embodiments with ammonyx LO and different solvents.
Figure 7:
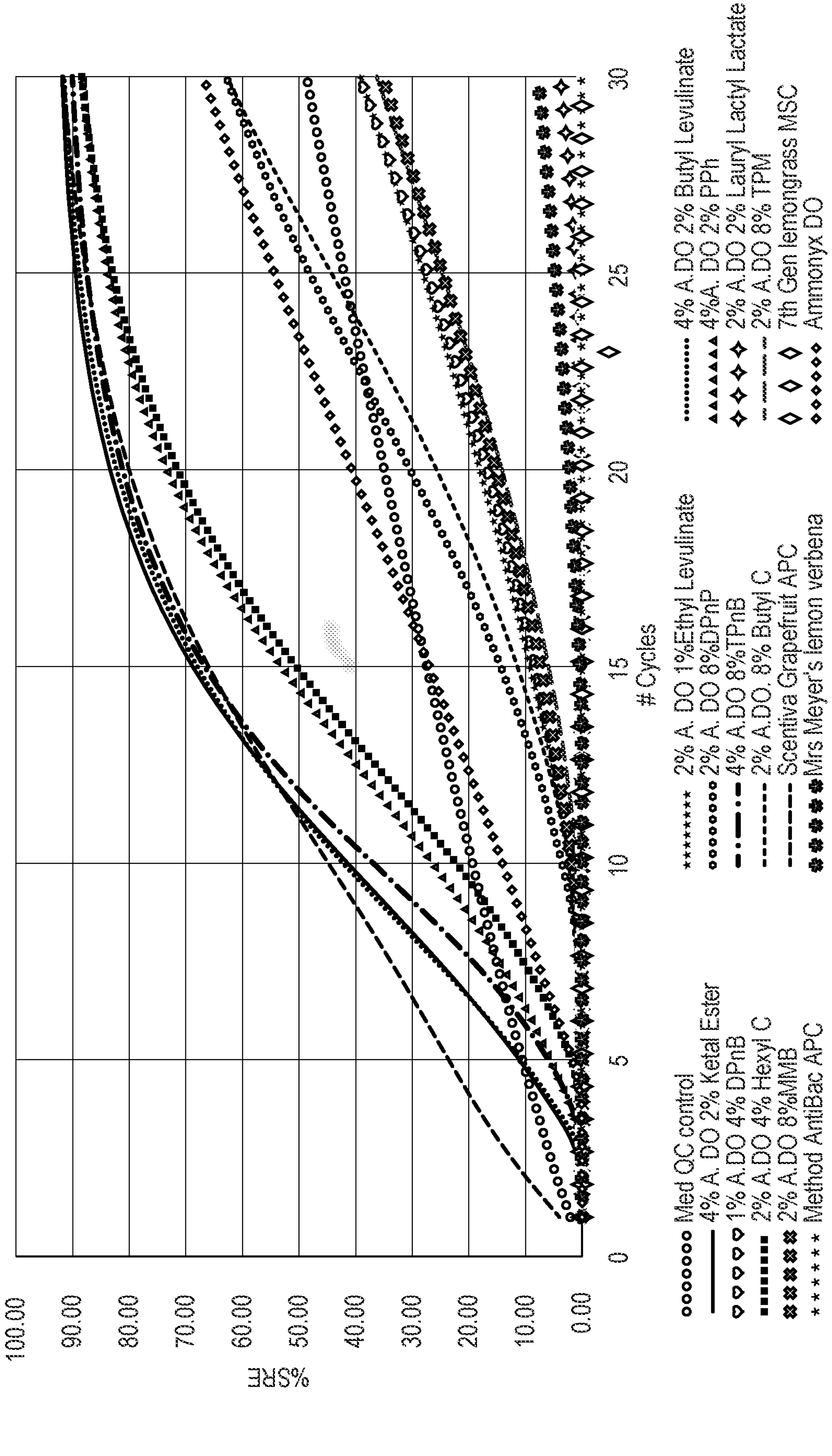
FIG. 7 shows experimental results of cleaning performance on kitchen grease of disclosed embodiments with ammonyx DO ("ADO") and different solvents.

FIGS. 6 and 7 illustrate experimental soil removal efficacy for formulations including either of the two surfactants with the highest cleaning efficacy (lauramine oxide and decylamine oxide) as shown in FIG. 4, paired with various of the screen solvents from FIG. 5. As noted above, the solvents with lower water solubility generally demonstrated higher soil removal efficiency.

FIG. 6 shows SRE results against kitchen grease for formulations including the lauramine oxide surfactant, paired with various solvents. As shown in FIG. 6, only the formulations including the butyl levulinate solvent and the hexyl carbitol solvent reached the 75% SRE threshold against kitchen grease. Results shown in FIG. 6 are also listed below in Table 1.

TABLE 1

| Formulation | Soil Removal Efficiency (%) at 30 Cycles | pH |
|---|---|---|
| 1% butyl levulinate + 4% lauramine oxide | 82.05 | 7.23 |
| 2% hexyl carbitol + 4% lauramine oxide | 76.61 | 7.72 |
| 4% DPNB + 2% lauramine oxide | 73.88 | 7.55 |
| 2% ketal ester + 2% lauramine oxide | 73.34 | 6.98 |
| 4% TPNB + 2% lauramine oxide | 64.97 | 7.57 |
| 1% PPh + 4% lauramine oxide | 63.52 | 7.83 |
| 8% ethyl levulinate + 1% lauramine oxide | 53.96 | 6.1 |
| 1% lauryl lactyl lactate + 4% lauramine oxide | 36.14 | 5.62 |
| 8% butyl carbitol + 1% lauramine oxide | 23.03 | 6.97 |
| 8% DPnP + 1% lauramine oxide | 20.0 | 7.48 |
| 8% TPM + 1% lauramine oxide | 8.10 | 7.37 |
| 8% MMB + 1% lauramine oxide | 0.01 | 5.58 |

As shown in FIG. 6 and Table 1, advantageously, some combinations of solvents+lauramine oxide exhibit a significant boost in cleaning efficacy as compared to the neat surfactant used alone. In addition, some solvents actually decrease the efficacy of the formulation, as compared to lauramine oxide alone. For example, the examples including butyl carbitol, DPnP and TPM perform poorly.

FIG. 7 shows SRE results against kitchen grease for formulations including the decylamine oxide surfactant, paired with various solvents. As shown in FIG. 7, the formulations including the butyl levulinate solvent, the ketal ester solvent, TPnB, hexyl carbitol and the PPh solvent reached the 75% SRE threshold against kitchen grease. Results shown in FIG. 7 are also listed below in Table 2.

TABLE 2

| Formulation | Cycles to Reach 75% SRE | pH |
|---|---|---|
| 2% butyl levulinate + 4% decylamine oxide | 17 | 7.48 |
| 2% levulinic ketal ester + 4% decylamine oxide | 17 | 7.71 |
| 8% TPnB + 4% decylamine oxide | 18 | 7.60 |
| 4% hexyl carbitol + 2% decylamine oxide | 20 | 7.47 |
| 2% PPh + 4% decylamine oxide | 21 | 7.75 |
| 4% DPnB + 1% decylamine oxide | Did Not Reach | 7.54 |
| 2% lauryl lactyl lactate + 2% decylamine oxide | Did Not Reach | 6.00 |
| 8% butyl carbitol + 2% decylamine oxide | Did Not Reach | 7.42 |
| 8% TPM + 2% decylamine oxide | Did Not Reach | 7.62 |
| 8% MMB + 2% decylamine oxide | Did Not Reach | 7.64 |
| 1% ethyl levulinate + 2% decylamine oxide | Did Not Reach | 7.60 |
| 8% DPnP + 2% decylamine oxide | Did Not Reach | 7.63 |

As shown in FIG. 7 and Table 2, some solvents, particularly the butyl levulinate ketal ester (e.g., a levulinic ketal ester) and TPnB significantly boost the cleaning efficacy of decylamine oxide against kitchen grease. Similar to FIG. 6, low performing solvents continued to demonstrate poor cleaning efficacy even in combination with decylamine oxide, with some demonstrating poorer performance than decylamine oxide alone.

Comparing FIG. 6 and Table 1 with FIG. 7 and Table 2, (and as shown in FIG. 4) decylamine oxide was shown to have higher cleaning efficacy than lauramine oxide. It is surprising that the shorter chain length of such an alkylamine oxide would provide improved results (e.g., conventional wisdom would suggest a longer chain length should provide better performance). A strong correlation was observed between the surfactant concentration and the cleaning performance. In other words, increasing the surfactant concentration leads to an increase in the cleaning performance against kitchen grease. With respect to solvent concentration, any such trend is less prominent. For example, in some cases, increasing the solvent concentration from 1% to 2% increased the cleaning efficiency, however there was not a significant increase in cleaning efficacy when further increasing the solvent concentration to 4%.

Figure 8:
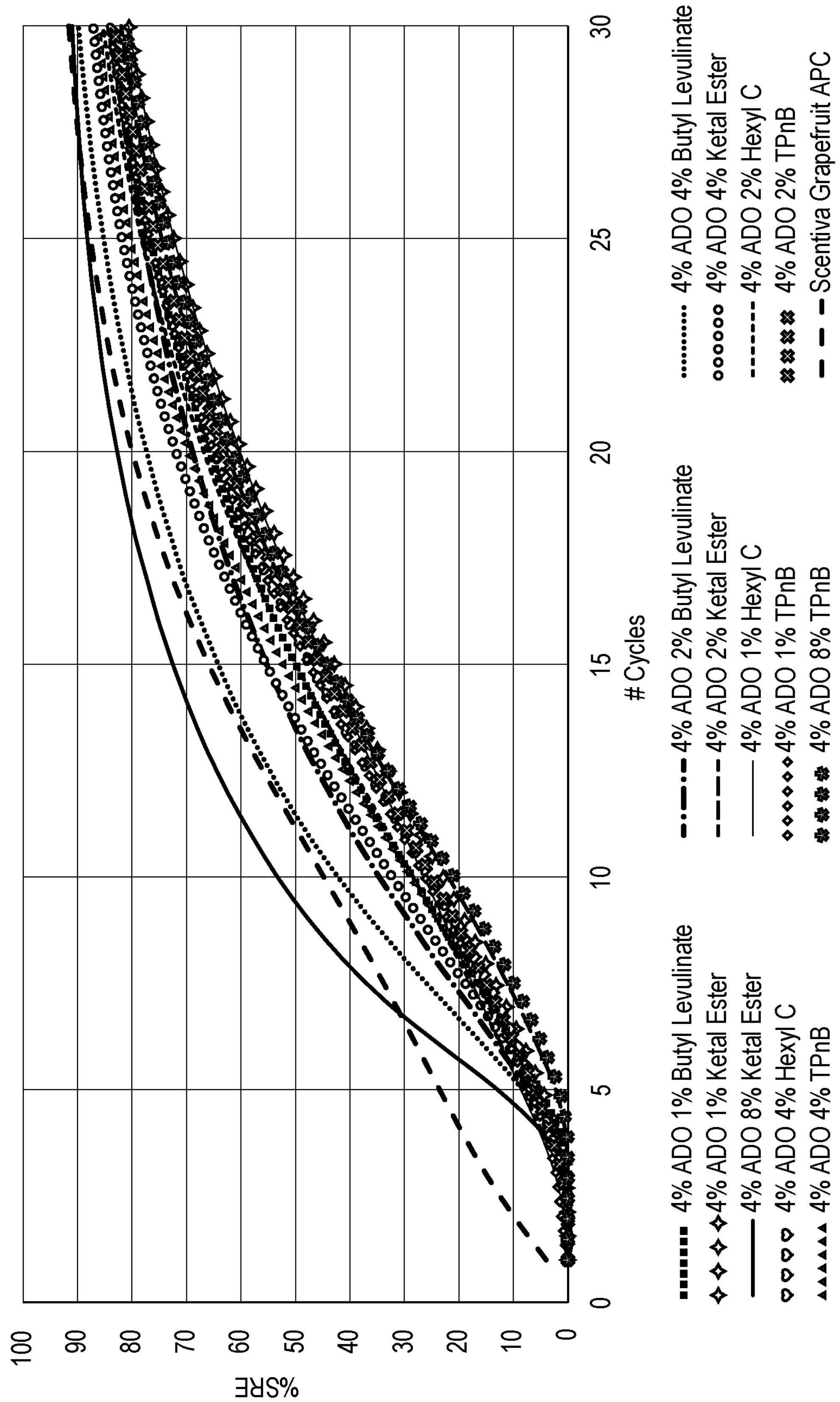
FIG. 8 shows experimental results of cleaning performance on kitchen grease of disclosed embodiments with 4% ADO and different solvents.
Figure 9:
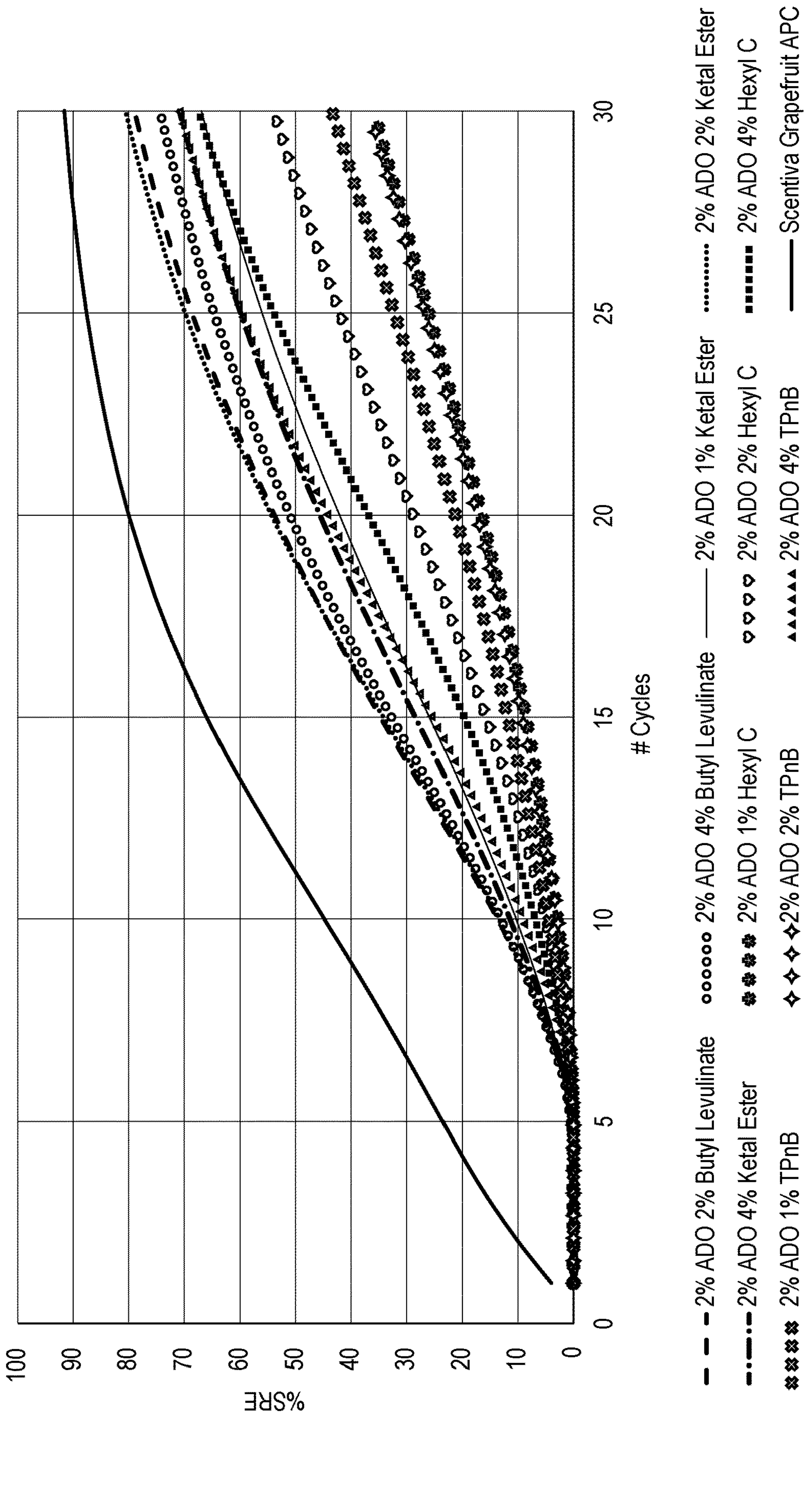
FIG. 9 shows experimental results of cleaning performance on kitchen grease of disclosed embodiments with 2% ADO and different solvents.
Figure 10:
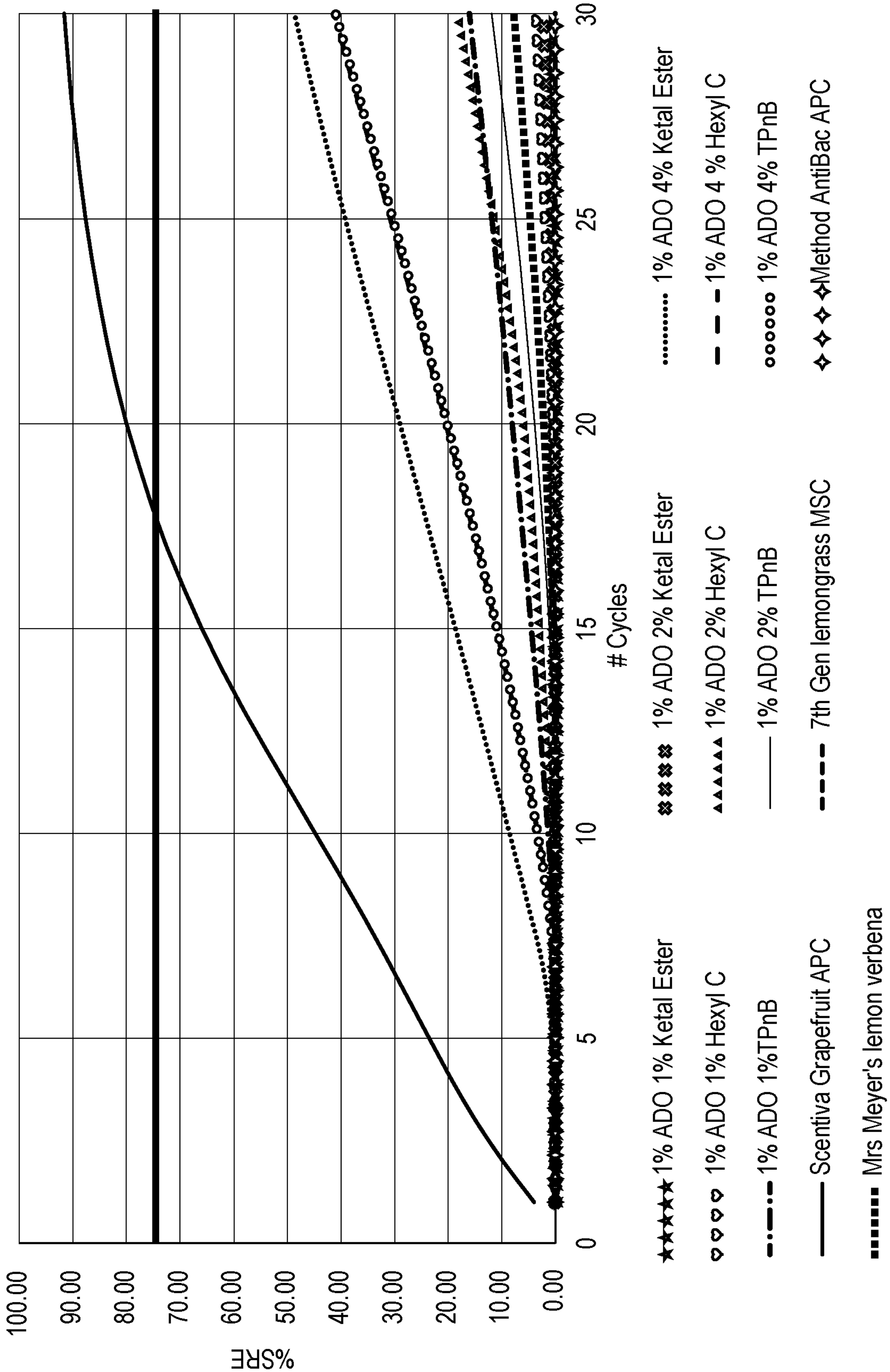
FIG. 10 shows experimental results of cleaning performance on kitchen grease of disclosed embodiments with 1% ADO and different solvents.

FIGS. 8 through 10 illustrate experimental results showing soil removal efficiency when including decylamine oxide at 4%, 2%, and 1%, respectively, paired with well performing solvents, against kitchen grease.

FIG. 8 illustrates results for 4% decylamine oxide with a variety of solvents compared to Scentiva Grapefruit APC. As shown, all examples reached a 75% SRE by the $26^{th}$ cycle. 4% decylamine oxide combined with the butyl levulinate solvent and 4% decylamine oxide combined with the ketal ester solvent (e.g., a levulinic ketal ester) demonstrated the highest soil removal efficiency in the shortest number of cycles. In particular, it is worth noting that the 4% decylamine oxide combined with 4% ketal ester solvent outperforms the commercially available comparative example, Scentiva Grapefruit APC.

FIG. 9 illustrates results for 2% decylamine oxide surfactant with a variety of solvents compared to Scentiva Grapefruit APC. As shown in FIG. 9, there is a significant decrease in soil removal efficacy as the concentration of decylamine oxide decreases to 2% from 4%. While the cleaning performance did decline, the decylamine oxide combined with the butyl levulinate surfactant and decyl amine oxide combined with the ketal ester solvent still exhibited the highest cleaning efficacy.

FIG. 10 illustrates how decreasing the decylamine oxide concentration to 1% further reduces efficacy. FIGS. 8-10 show that there is a strong correlation between surfactant concentration and cleaning efficacy.

Figure 11:
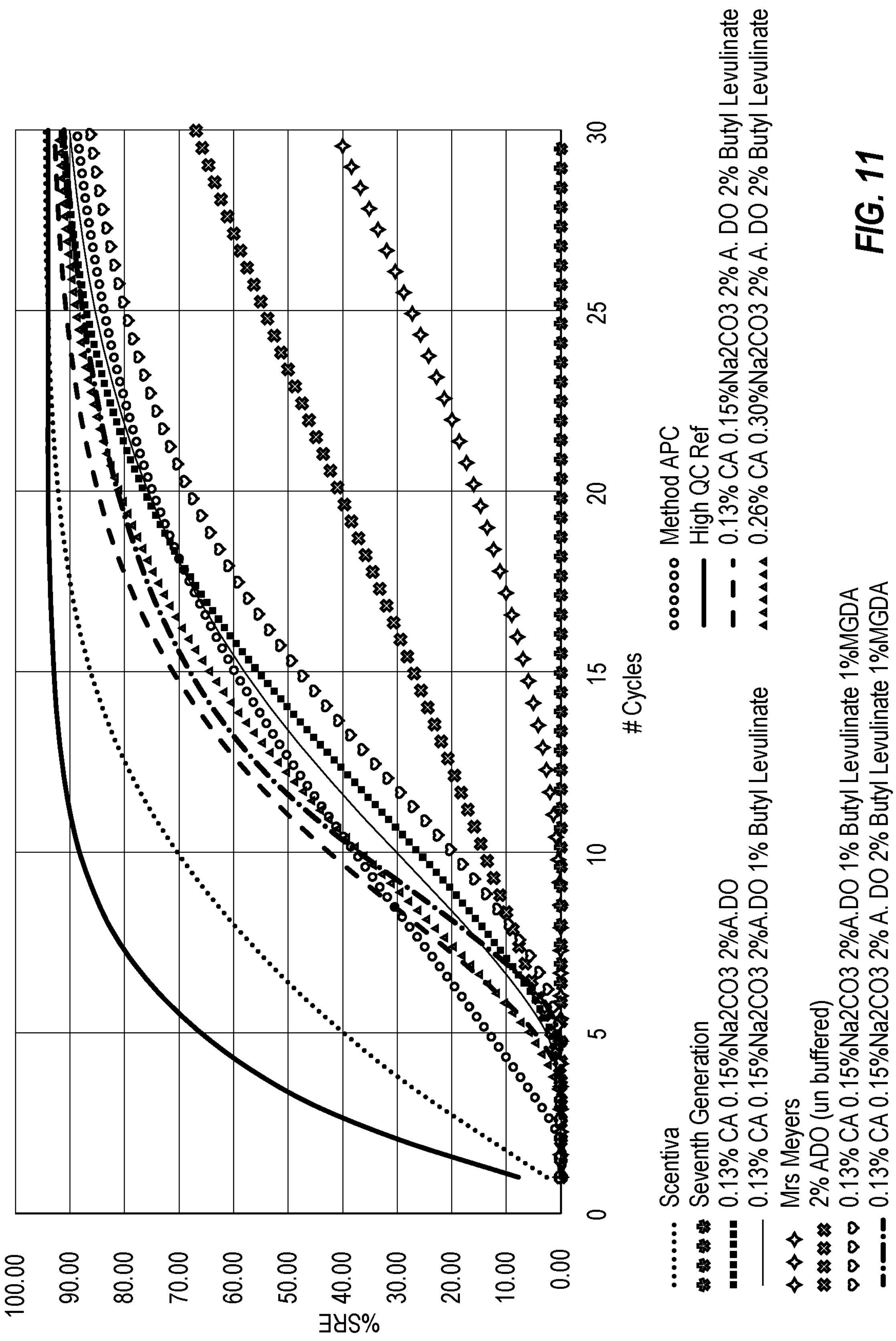
FIG. 11 shows experimental results of cleaning performance on kitchen grease of disclosed embodiments with different buffers.
Figure 12:
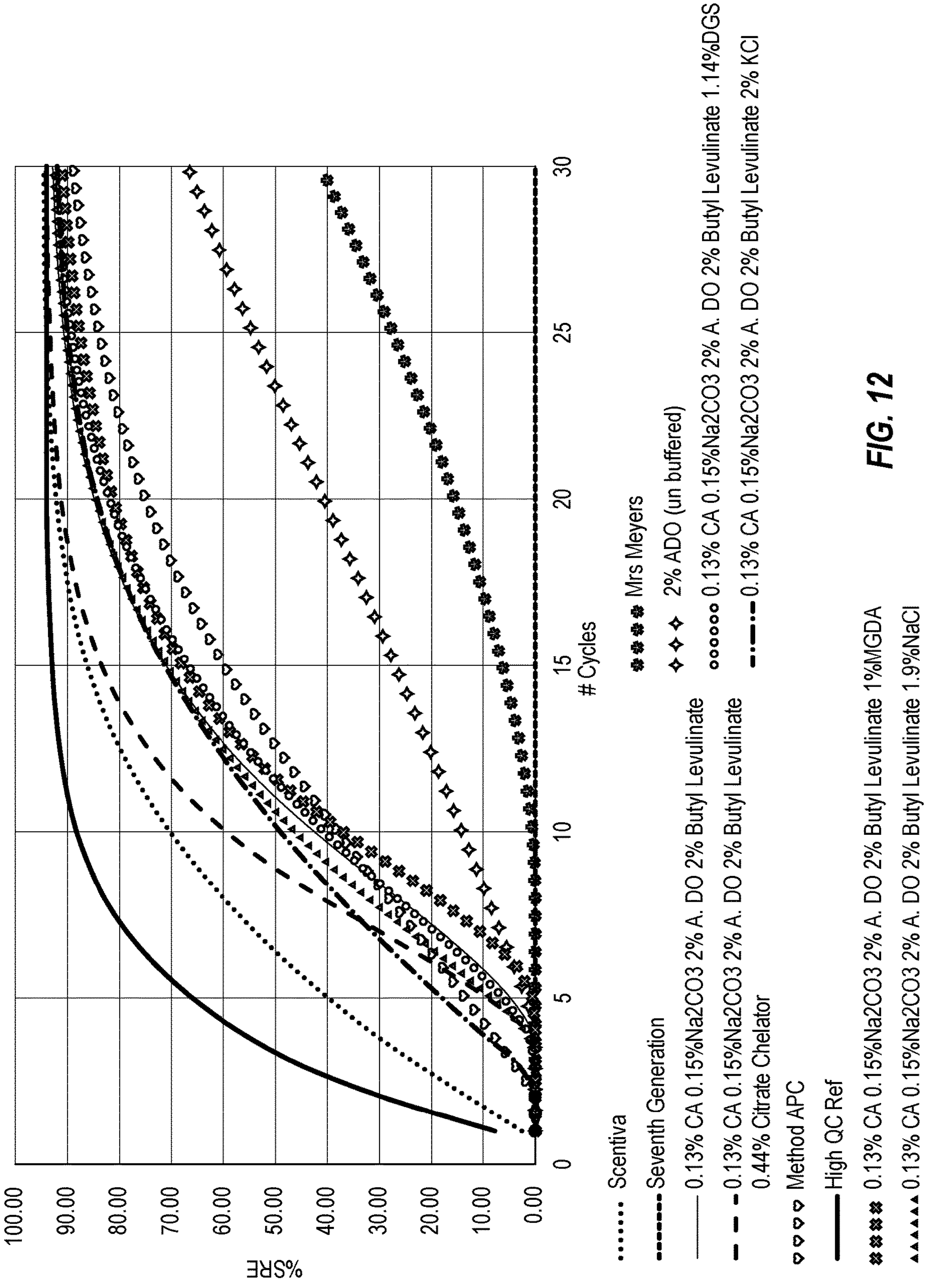
FIG. 12 shows experimental results of cleaning performance on kitchen grease of disclosed embodiments with different salts and chelators.
Figure 13:
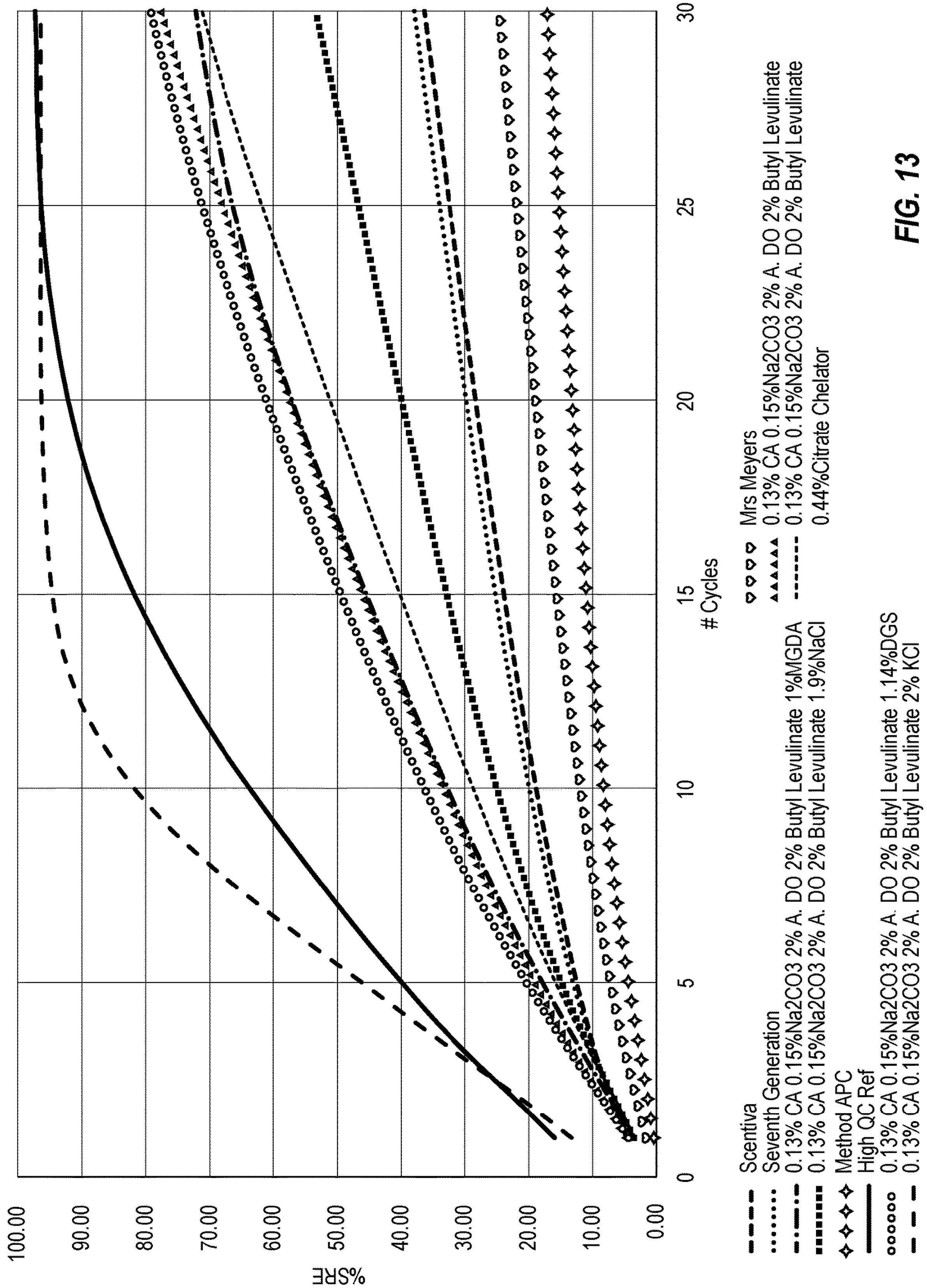
FIG. 13 shows experimental results of cleaning performance on bathroom soil of disclosed embodiments with different salts and chelators.

FIGS. 11-13 illustrate the effect that various adjuvants (e.g., buffers, chelators, and/or salts) can have on boosting the efficacy of the contemplated formulations, e.g., even where the surfactant is limited to only 2%.

For example, FIG. 11 illustrates experimental results showing the impact of inclusion of a buffer on the soil removal efficacy of the formulation against kitchen grease. The different compositions tested in FIG. 11 included: 1) an unbuffered formulation with 2% surfactant, 2) a buffered formulatin with 2% surfactant, 3) a buffered formulation with both surfactant and solvent, 4) a buffered formulation with surfactant, solvent, and chelator, 5) a buffered formulation with surfactant, reduced solvent, and a chelator that is a trisodium salt of methylglycinediacetic acid ("MGDA"), and 6) a formulation with surfactant, solvent, and elevated buffer concentration. The results were compared to SCENTIVA, MRS MEYERS, METHOD APC, SEVENTH GENERATION, and a high quality control reference formulation.

FIG. 11 shows that the inclusion of a buffer significantly improves efficacy, but that as the buffer concentration increases, the cleaning efficacy does not significantly increase. For example, buffer concentrations of less than 0.3% total buffer (e.g., 0.013% citric acid and 0.15% sodium carbonate) are sufficient. Additionally, when the solvent is reduced to 1%, rather than 2%, the cleaning performance decreases, (e.g., by about 4 cycles, to achieve the same SRE). The particular chelator used in FIG. 11 did not significantly improve performance against kitchen grease.

FIG. 12 illustrates experimental results showing the impact of addition of a chelator and/or salt on the cleaning efficacy of the composition against kitchen grease. As shown in FIG. 12, the buffered surfactant/solvent formulation with a citrate chelating agent demonstrates parity cleaning performance to SCENTIVA, at 16 cycles. Such a citrate chelating agent is more effective, at substantially neutral pH, than the MGDA chelating agent. For example, it is believed that the deprotonated COO of the citrate at the neutral pH boosts cleaning performance within the buffered formulation including the surfactant and solvent. Adding the sodium chloride and/or potassium chloride salts with the chelators did not enhance the cleaning performance of the buffered surfactant/solvent formulation.

FIG. 13 illustrates experimental results showing the impact of inclusion of an additional salt on the cleaning efficacy of the composition against bathroom soil. While inclusion of a potassium salt such as potassium chloride had little to no effect on kitchen grease, the addition of such a potassium salt (e.g., at 2%) significantly improves the cleaning efficacy of the composition on bathroom soil, as shown in FIG. 13.

Without departing from the spirit and scope of this invention, one of ordinary skill can make various modifications to the invention to adapt it to various usages and conditions. As such, these changes and modifications are properly, equitably, and intended to be, within the full range of equivalence of the following claims.

The invention claimed is:

1. A substantially neutral base multi-surface cleaning formulation comprising:
- (a) an alkyl amine oxide surfactant;
- (b) an alkyl levulinate solvent;
- (c) at least one of a buffer, chelator or a salt; and
- (d) water;

wherein the formulation has a substantially neutral pH, of from about 6 to about 8.

2. The formulation of claim 1, wherein the formulation comprises the chelator, which comprises a citrate.

3. The formulation of claim 1, wherein the formulation comprises the salt, which comprises a potassium salt.

4. The formulation of claim 1, further comprising a buffer.

5. The formulation of claim 4, wherein the buffer comprises at least one of sodium carbonate or citric acid.

6. The formulation of claim 1, wherein the alkyl amine oxide surfactant is included in a weight percentage from about 0.5% to about 10%.

7. The formulation of claim 6, wherein the alkyl amine oxide surfactant is included in a weight percentage from about 2% to about 4%.

8. The formulation of claim 1, wherein the alkyl levulinate solvent is included in a weight percentage from about 0.5% to about 15%.

9. The formulation of claim 8, wherein the alkyl levulinate solvent is included in a weight percentage from about 2% to about 8%.

10. The formulation of claim 1, wherein the chelator is included in a weight percentage from about 0.1% to about 1%.

11. The formulation of claim 1, wherein the formulation comprises both the chelator and the salt.

12. A substantially neutral base multi-surface cleaning formulation comprising:
- (a) an alkyl amine oxide surfactant;
- (b) an ethyl levulinate solvent and/or a butyl levulinate solvent;
- (c) a citrate chelator;
- (d) a potassium salt;
- (e) at least one of a carbonate or citric acid buffer; and (f) water;

wherein the formulation has a substantially neutral pH from about 6 to about 8.

13. The formulation of claim 12, wherein the formulation includes both of a sodium carbonate buffer and a citric acid buffer.

14. The formulation of claim 12, wherein the alkyl amine oxide surfactant is included in a weight percentage from about 0.5% to about 10%.

15. The formulation of claim 14, wherein the alkyl amine oxide surfactant is included in a weight percentage from about 2% to about 4%.

16. The formulation of claim 12, wherein the ethyl levulinate solvent and/or butyl levulinate solvent is included in a weight percentage from about 0.5% to about 15%.

17. The formulation of claim 16, wherein the ethyl levulinate solvent and/or butyl levulinate solvent is included in a weight percentage from about 2% to about 8%.

18. The formulation of claim 12, wherein the chelator is included in a weight percentage from about 0.1% to about 1%.

19. The formulation of claim 12, wherein formulation has a pH of from 6.5 to 7.5.

20. The formulation of claim 12, wherein formulation further comprises an antimicrobial agent.

21. A substantially neutral base multi-surface cleaning formulation comprising:

(a) about 0.5% to about 10% of an alkyl amine oxide surfactant;

(b) about 0.5% to about 15% of a butyl levulinate solvent;

(c) about 0.1% to about 1% of a citrate chelator;

(d) a potassium salt;

(e) about 0.1% to about 1% of a carbonate and/or citric acid buffer; and (f) water, wherein the formulation has a substantially neutral pH, from about 6.5 to about 7.5.

* * * * *